United States Patent [19]

Weisman

[11] Patent Number: 4,525,386
[45] Date of Patent: * Jun. 25, 1985

[54] TECHNIQUE FOR PROPERTY ENHANCEMENT OF OPEN-CELL FOAM MATERIAL

[76] Inventor: Morey Weisman, 147-23 Charter Rd., Jamaica, N.Y. 11435

[*] Notice: The portion of the term of this patent subsequent to Nov. 13, 2001 has been disclaimed.

[21] Appl. No.: 669,517

[22] Filed: Nov. 8, 1984

Related U.S. Application Data

[63] Continuation-in-part of Ser. No. 592,715, Mar. 23, 1984, Pat. No. 4,482,582.

[51] Int. Cl.$^3$ .............................................. B05D 1/24
[52] U.S. Cl. ................................... 427/185; 427/195; 427/244; 427/393.5; 428/319.7; 521/53; 521/55; 521/137; 521/918
[58] Field of Search ............ 427/185, 195, 244, 393.5; 428/319.7; 521/53, 55, 137, 918

[56] References Cited

U.S. PATENT DOCUMENTS

| 2,981,631 | 4/1961 | Nagel | 427/185 |
| 3,061,460 | 10/1962 | Weisman | 428/319.7 |
| 3,393,119 | 7/1968 | Dugan | 428/319.7 |
| 3,535,197 | 10/1970 | Fishbein et al. | 428/319.7 |
| 4,439,548 | 3/1984 | Weisman | 521/130 |

Primary Examiner—Morton Foelak
Attorney, Agent, or Firm—Michael Ebert

[57] ABSTRACT

A technique for enhancing the mechanical, thermal or other properties of an open-cell synthetic plastic foam body by injecting filler particles into the cells thereof. The filler particles, which may take the form of microspheres of glass, metal powers or other additives, depending on the property to be enhanced, are fed into a pressurized stream of air which is projected at high velocity to fluidize the particles. The stream is directed toward the surface of the body to cause the particles carried thereby to impregnate the cells.

7 Claims, No Drawings

TECHNIQUE FOR PROPERTY ENHANCEMENT OF OPEN-CELL FOAM MATERIAL

RELATED CASE

This application is a continuation-in-part of my copending application Ser. No. 592,715, filed 3/23/84, now U.S. Pat. No. 4,482,582, on a "Modified Polyurethane Product Having Improved Load Bearing Characteristics." The entire disclosure of my copending application is incorporated herein by reference.

BACKGROUND OF INVENTION

Field of Invention

This invention relates generally to a method for enhancing the properties of a layer of open-cell foam plastic material, and more particularly to a method in which the cells of the layer are impregnated with filler particles that impart the desired properties to the layer.

In my above-identified copending application, there is disclosed a flexible, open-cell polyurethane foam product having acceptable dielectric heat-sealing characteristics. To further enhance the dielectric heat-sealing characteristics of the open-cell polyurethane foam product, the product is saturated or permeated with thermoplastic powders such as PVC having a dielectric loss index greater than that of polyurethane.

The concern of the present invention is with the enhancement of certain properties of an open-cell plastic foam layer or product other than its dielectric-heat sealing properties.

The property enhancement of interest may be the mechanical properties of the plastic foam layer, or the thermal or electrical insulation or conductivity properties thereof. Thus, as indicated in the article by Vance Staymer, "Non Fibrous Property Enhancers," which appears in the 1983-1984 edition of the Modern Plastic Encyclopedia (pages 125 et seq.), a mix of magnesium sulfate and other non-fibrous materials can be used to impart fire retardance or smoke suppression characteristics to plastic building panels.

The term "non-fibrous" filler materials includes high-density silica sands and hollow glass spheres. Carbon, metal powder, or silver-coated glass spheres can be used as electrically-conductive fillers in plastics to carry off static electricity and to provide electromagnetic shielding.

Where the filler particles are intermixed with the plastic resin in the slurry state, this process is feasible if the particle sizes are small. Or the filler particles may be intermixed with resin particles which are then rendered molten and injection molded or extruded to form plastic products in which the filler particles are dispersed.

But in producing a synthetic plastic, open-cell foam product, the foam-forming reactive mixture contains a foaming agent and a reaction catalyst; hence the addition of a particulate filler to the reactive mixture may, depending on the physical and chemical nature of the filler particles, interfere with the foam-forming process or impair the quality of the product.

SUMMARY OF INVENTION

The main object of this invention is to provide a technique for injecting into the open cells of a synthetic plastic foam layer or product filler particles which enhance the mechanical, thermal or other properties thereof.

More particularly, an object of this invention is to provide a technique in which the introduction of the filler particles does not impair the quality of the open-cell foam plastic material, the filler particles being introduced after the material is in being and not in the course of its production.

Briefly stated, in a technique in accordance with the invention, the filler particles, which may take the form of micro-spheres of glass or other particles in the micron range, are fed into a pressurized stream of air which is projected at high velocity to fluidize the particles. This stream is directed toward the surface of a permeable, open-cell foam plastic body to cause the particles carried thereby to impregnate the cells.

DESCRIPTION OF INVENTION

We shall first discuss the nature of those particulate fillers which are usable to enhance the properties of an open-cell, foam plastic body which may be made of polyurethane in the manner disclosed in my above-identified copending application. Or the body to be treated may be made of other synthetic plastic, open-cell foam material such as PVC.

A flame retardant is a chemical additive that inhibits the burning characteristics of a material (see article by D. J. Scharf, "Flame Retardants" in the 1983-1984 Modern Plastics Encyclopedia). Known inorganic fillers for plastics which function as flame retardants include antimony oxide, zinc borate, hydrated alumina and molybdenum compounds.

Many fatalities in fires are caused by smoke which arises before flames become a problem. Available smoke supressants for plastics include molybdenum trioxide, zinc, iron compounds and aluminum compounds.

As property enhancers to modify the flexural modulus, the compressive and shear strengths and other mechanical properties of thermoplastic molding materials, it is known to use hollow alumina-silica micro-spheres. One may also disperse within plastic materials solid fragrance concentrate additives such as "Polyiff" producced by International Flavors & Fragrances of Hazlet, N.J.

The present invention encompasses all filler particles which are suitable as property enhancers in plastic bodies. The filler particles for inclusion in an open-cell, plastic foam body must be in the micron range, so that they can be injected into the open cells.

The filler particles selected for injection to enhance the properties of a foam plastic layer or other body to be treated are fed into a pressurized stream of air projected at high velocity from a jet zone machine of the type described in U.S. Pat. No. 3,329,377. A machine of this type is marketed by Wolverine Corporation of Methuen, Mass.

The filler particles fed into the pressurized air stream are fluidized therein, the stream carrying these particles being directed toward the surface of the permeable foam plastic layer. As a consequence, the particles which impinge at high velocity on the foam plastic body as the air stream permeates the body become entrapped in and impregnate the open cells thereof.

When the foam plastic layer is relatively thin, then the open cells throughout the body thereof are impregnated by the filler particles. But if the layer is thick, the region adjacent the surface of the layer subjected to the stream has a higher concentration of filler particles than the deeper region. If a more uniform dispersion of filler particles is desirable, the layer, after impregnation through one face thereof, is reversed for impregnation through the other face.

Inasmuch as the foam plastic body is preformed, its subsequent impregnation by the property-enhancing filler particles does not impair its basic structural or chemical properties.

While there has been shown and described a preferred embodiment of a technique for property enhancement of open-cell foam material in accordance with the invention, it will be appreciated that many changes and modifications may be made therein without, however, departing from the essential spirit thereof.

I claim:

1. A technique for enhancing the properties of a body formed of open-cell, synthetic foam plastic material comprising the steps of:

A feeding particles of a filler having the desired properties into a stream of pressurized air which is projected at high velocity, whereby the particles are fluidized in the stream; and B directing said air stream toward the surface of the body to cause the particles carried thereby to impregnate the cells of the foam plastic material.

2. A technique as set forth in claim 1, wherein said particles are in the micron size range.

3. A technique as set forth in claim 2, wherein said particles are spherical.

4. A technique as set forth in claim 1, wherein said particles have a composition imparting flame retardance properties to said body.

5. A technique as set forth in claim 1, wherein said particles are of a composition imparting smoke suppression properties to said body.

6. A technique as set forth in claim 1, wherein said particles are of a composition which modifies the mechanical properties of the body.

7. A technique as set forth in claim 1, wherein said particles are of a composition which imparts a fragrance to the body.

* * * * *